(12) United States Patent
Kamihira et al.

(10) Patent No.: US 10,731,280 B2
(45) Date of Patent: Aug. 4, 2020

(54) NON-TRANSITORY COMPUTER-READABLE STORAGE MEDIUM STORING EMBROIDERY DATA GENERATION PROGRAM, AND EMBROIDERY DATA GENERATION DEVICE

(71) Applicant: BROTHER KOGYO KABUSHIKI KAISHA, Nagoya-shi, Aichi-ken (JP)

(72) Inventors: Yuta Kamihira, Nagoya (JP); Mayumi Nishizaki, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 179 days.

(21) Appl. No.: 16/107,006

(22) Filed: Aug. 21, 2018

(65) Prior Publication Data
US 2019/0062971 A1    Feb. 28, 2019

(30) Foreign Application Priority Data

Aug. 30, 2017    (JP) .................................. 2017-165205

(51) Int. Cl.
| | | |
|---|---|---|
| *D05B 19/10* | (2006.01) | |
| *D05C 5/04* | (2006.01) | |
| *G06T 7/90* | (2017.01) | |
| *D05C 5/02* | (2006.01) | |
| *G06T 1/00* | (2006.01) | |
| *D05B 19/12* | (2006.01) | |

(52) U.S. Cl.
CPC ............. *D05B 19/10* (2013.01); *D05B 19/12* (2013.01); *D05C 5/02* (2013.01); *D05C 5/04* (2013.01); *G06T 1/0007* (2013.01); *G06T 7/90* (2017.01)

(58) Field of Classification Search
CPC ........ D05B 19/02; D05B 19/08; D05B 19/10; D05B 19/12; D05C 5/00; D05C 5/02; D05C 5/04
USPC .................................................. 700/136–138
See application file for complete search history.

(56) References Cited

U.S. PATENT DOCUMENTS

| | | | | |
|---|---|---|---|---|
| 6,098,554 A | * | 8/2000 | Orii ........................ | D05B 19/08 112/102.5 |
| 7,587,257 B2 | * | 9/2009 | Niimi ..................... | D05B 19/08 700/138 |

(Continued)

FOREIGN PATENT DOCUMENTS

| | | |
|---|---|---|
| JP | 2001-259268 A | 9/2001 |
| JP | 2014-83339 A | 5/2014 |

*Primary Examiner* — Nathan E Durham
(74) *Attorney, Agent, or Firm* — Oliff PLC

(57) ABSTRACT

A non-transitory computer-readable medium stores computer-readable instructions for sewing data generation executed by a processor in a sewing data generation device. The instructions comprises acquiring image data and determining a mode to determine a tendency of a plurality of thread colors to be used. The plurality of thread colors to be used is thread colors used in sewing of an embroidery pattern that represents an image represented by the acquired image data. The instructions also comprises selecting, on the basis of a target mode that is the determined mode, a plurality of thread colors among which at least one thread color is different for each of the modes, from a plurality of thread colors stored in a storage portion, as the plurality of thread colors to be used, and generating embroidery data to form, using a sewing machine, stitches of the selected plurality of thread colors to be used.

12 Claims, 10 Drawing Sheets

(56) References Cited

U.S. PATENT DOCUMENTS

| | | | | |
|---|---|---|---|---|
| 7,693,598 B2* | 4/2010 | Yamada | ................ | D05B 19/08 |
| | | | | 112/102.5 |
| 8,793,009 B2* | 7/2014 | Ihira | ..................... | D05C 5/04 |
| | | | | 112/470.01 |
| 2002/0038162 A1 | 3/2002 | Yamada | | |
| 2010/0305744 A1* | 12/2010 | Yamada | ................. | D05C 5/04 |
| | | | | 700/138 |
| 2011/0160894 A1* | 6/2011 | Yamada | ................. | D05C 5/04 |
| | | | | 700/138 |
| 2012/0116569 A1* | 5/2012 | Yamada | ............... | D05B 19/10 |
| | | | | 700/138 |
| 2012/0303152 A1* | 11/2012 | Yamada | ............... | D05B 19/08 |
| | | | | 700/138 |
| 2013/0036957 A1* | 2/2013 | Kato | ................... | D05B 19/12 |
| | | | | 112/102.5 |
| 2014/0116308 A1 | 5/2014 | Yamada | | |

\* cited by examiner

FIG. 8

| THREAD COLOR TO BE USED(X) | COLOR REGION | HUE | THREAD COLOR No. |
|---|---|---|---|
| 1 | K | Y | 205 |
| 2 | I | G | 027 |
| 3 | A | – | 001 |
| 4 | K | R | 800 |
| 5 | K | G | 509 |
| 6 | K | C | 534 |
| 7 | K | B | 420 |
| 8 | K | M | 614 |
| 9 | C | – | 817 |
| 10 | I | R | 333 |

FIG. 9

| HREAD COLOR PRIORITY (Y, Z) | COLOR REGION | HUE | THREAD COLOR No. |
|---|---|---|---|
| 1 | A | — | 001 |
| 2 | E | — | 900 |
| 3 | K | R | 800 |
| 4 | K | G | 509 |
| 5 | K | C | 534 |
| 6 | K | B | 420 |
| 7 | K | M | 614 |
| 8 | C | — | 817 |
| 9 | I | R | 333 |
| 10 | I | Y | 328 |
| 11 | I | C | 542 |
| 12 | I | B | 017 |
| 13 | I | M | 810 |
| ⋮ | ⋮ | ⋮ | ⋮ |

FIG. 10

BASIC PRIORITY INFORMATION

| THREAD COLOR PRIORITY (Y) | COLOR REGION | HUE | THREAD COLOR No. |
|---|---|---|---|
| 1 | A | – | 001 |
| 2 | E | – | 900 |
| 3 | K | R | 800 |
| 4 | K | Y | 205 |
| 5 | K | G | 509 |
| 6 | K | C | 534 |
| 7 | K | B | 420 |
| 8 | K | M | 614 |
| 9 | C | – | 817 |
| 10 | I | R | 333 |
| 11 | I | Y | 328 |
| 12 | I | G | 027 |
| 13 | I | C | 542 |
| 14 | I | B | 017 |
| 15 | I | M | 810 |
| ⋮ | ⋮ | ⋮ | ⋮ |

NON-TRANSITORY COMPUTER-READABLE STORAGE MEDIUM STORING EMBROIDERY DATA GENERATION PROGRAM, AND EMBROIDERY DATA GENERATION DEVICE

CROSS-REFERENCE TO RELATED APPLICATION

This application claims priority to Japanese Patent Application No. 2017-165205, filed on Aug. 30, 2017, the content of which is hereby incorporated by reference.

BACKGROUND

The present disclosure relates to a non-transitory computer-readable storage medium storing an embroidery data generation program, and to an embroidery data generation device.

An embroidery data generation device is known that generates embroidery data used for a sewing machine to sew an embroidery pattern on the basis of image data, such as a photo or the like. In the known embroidery data generation device, when generating the embroidery data, thread colors to be used to sew the embroidery pattern are selected. More specifically, a number of the thread colors to be used to sew the embroidery pattern is acquired. Use frequencies of the thread colors are calculated on the basis of the color of each of pixels configuring the image represented by the image data. Then, on the basis of the calculated use frequencies of the thread colors, the number of the thread colors corresponding to the thread colors to be used to sew the embroidery pattern is selected.

SUMMARY

The image that is to be sewn can be separated into categories, such as a scenery image, a night-scene image, a portrait image and the like. There is a case in which there are colors having a high priority for use in accordance with the category. In this case, if the thread colors to be used in the sewing of the embroidery pattern are selected on the basis of the use frequencies of the thread colors, due to conditions such as a replacement frequency of a thread and the like, the number of the thread colors that can be used in the sewing is limited. Thus, there is a possibility that the thread colors having the high priority for use are not selected. When the thread colors having the high priority for use are not selected, it is possible that the color tone of the formed embroidery pattern does not match the color tone of the category of the image.

It is an object of the present disclosure to provide a non-transitory computer-readable storage medium storing an embroidery data generation program and an embroidery data generation device that are capable of generating embroidery data used to form an embroidery pattern that represents a color tone that accords with a category of an image.

Various embodiments herein provide a non-transitory computer-readable medium storing computer-readable instructions for sewing data generation that are executed by a processor provided in a sewing data generation device. The computer-readable instructions perform processes comprising acquiring image data, and determining, from a plurality of modes, a mode to determine a tendency of a plurality of thread colors to be used, the plurality of thread colors to be used being thread colors used in sewing of an embroidery pattern that represents an image represented by the acquired image data. The computer-readable instructions also perform processes comprising selecting, on the basis of a target mode that is the determined mode, a plurality of thread colors among which at least one thread color is different for each of the modes, from a plurality of stored thread colors that are thread colors stored in a storage portion, as the plurality of thread colors to be used, and generating embroidery data to form, using a sewing machine, stitches of the selected plurality of thread colors to be used.

Various embodiments also provide a sewing data generation device that includes a processor and a memory storing computer-readable instructions. When executed by the processor, the computer-readable instructions perform processes comprising acquiring image data, and determining, from a plurality of modes, a mode to determine a tendency of a plurality of thread colors to be used, the plurality of thread colors to be used being thread colors used in sewing of an embroidery pattern that represents an image represented by the acquired image data. The computer-readable instructions also perform processes comprising selecting, on the basis of a target mode that is the determined mode, a plurality of thread colors among which at least one thread color is different for each of the modes, from a plurality of stored thread colors that are thread colors stored in a storage portion, as the plurality of thread colors to be used, and generating embroidery data to form, using a sewing machine, stitches of the selected plurality of thread colors to be used.

BRIEF DESCRIPTION OF THE DRAWINGS

Embodiments of the disclosure will be described below in detail with reference to the accompanying drawings in which:

FIG. 8 is a diagram showing a selection result of the thread colors to be used;

FIG. 9 is a diagram showing identification results of a thread color priority; and FIG. 10 is a schematic diagram of basic priority information 201 (a modified example).

DETAILED DESCRIPTION OF EMBODIMENTS

Figure 1:
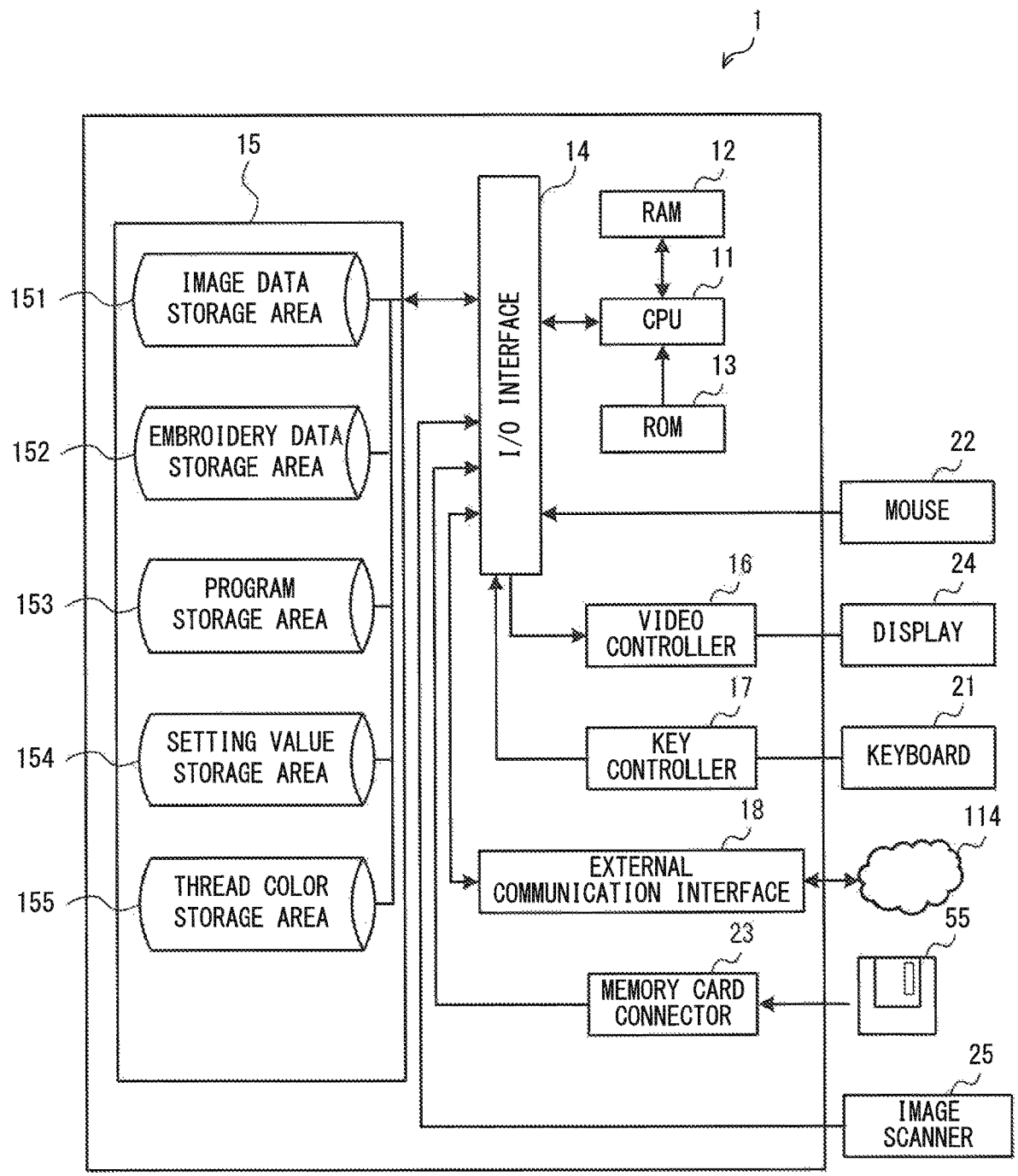
FIG. 1 is a block diagram showing an electrical configuration of an embroidery data generation device 1.

An embodiment of the present disclosure will be explained with reference to the drawings. A configuration of an embroidery data generation device 1 will be explained with reference to FIG. 1. The embroidery data generation device 1 can generate embroidery data for forming stitches of an embroidery pattern, using a sewing machine 3 (refer to FIG. 2). The embroidery data generation device 1 is a general purpose computer, such as a so-called personal computer.

The embroidery data generation device 1 is provided with a CPU 11. The CPU 11 is a controller that performs control of the embroidery data generation device 1. A RAM 12, a ROM 13, and an input/output (I/O) interface 14 are connected to the CPU 11. The RAM 12 temporarily stores various types of data, such as calculation results and the like obtained from arithmetic processing by the CPU 11. The ROM 13 stores a BIOS and the like.

The I/O interface 14 mediates in the transmission and reception of data between various devices. The I/O interface 14 is connected to a hard disk device (HDD) 15, a mouse 22, a video controller 16, a key controller 17, an external communication interface 18, a memory card connector 23, and an image scanner 25. The mouse 22 is used to input various pieces of information. A display 24 is connected to the video controller 16. The display 24 displays various pieces of information. A keyboard 21 is connected to the key controller 17. The keyboard 21 is used to input various pieces of information. The external communication interface 18 allows the embroidery data generation device 1 to be connected to a network 114. The embroidery data generation device 1 can connect to an external device via the network 114. A memory card 55 can be connected to the memory card connector 23. The embroidery data generation device 1 can read data from the memory card 55 and write data into the memory card 55, via the memory card connector 23. The image scanner 25 can read an image, such as a photo or the like.

The HDD 15 includes an image data storage area 151, an embroidery data storage area 152, a program storage area 153, a setting value storage area 154, and the like. The image data storage area 151 stores image data of the image or the like, that is the source of the embroidery data generation. The embroidery data storage area 152 stores embroidery data generated by main processing. The program storage area 153 stores programs used for various processing performed by the embroidery data generation device 1, such as an embroidery data generation program and the like. The embroidery data generation device 1 may acquire the embroidery data generation program from outside via the network 114 and store the embroidery data generation program in the program storage area 153. The embroidery data generation device 1 may be provided with a DVD drive, and may read out the embroidery data generation program stored on a medium such as a DVD and store the embroidery data generation program in the program storage area 153.

The setting value storage area 154 stores data of setting values used in various processing. For example, the setting value storage area 154 stores priority information 100 (refer to FIG. 6) that will be described later. A thread color storage area 155 stores a plurality of colors of embroidery threads (hereinafter referred to as "thread colors"). Below, the thread colors stored in the thread color storage area 155 are referred to as "stored thread colors." A thread color No., such as 001 to 900, is assigned to each of the plurality of stored thread colors (refer to FIG. 8). The plurality of stored thread colors are associated with each of a plurality of thread color groups. Specifically, each of the plurality of thread color groups includes two or more of the thread colors among the plurality of stored thread colors. In general, the embroidery threads are in sets (hereinafter referred to as "thread sets") in which types of a plurality of thread colors are decided in advance. A single thread color group is associated with all of the thread colors included in a single thread set.

Figure 2:
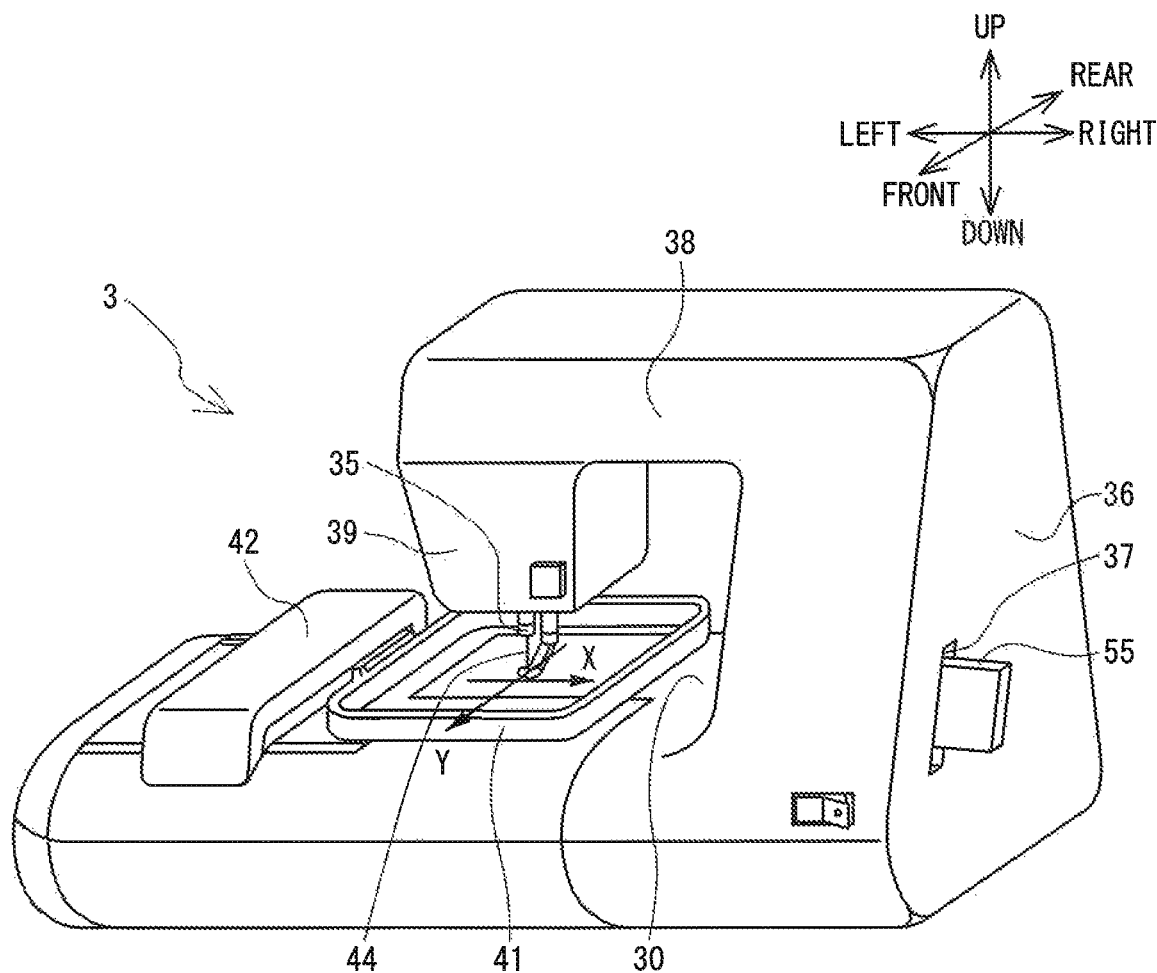
FIG. 2 is a perspective view of a sewing machine 3 as seen from above and from the front right.

The sewing machine 3 will be explained with reference to FIG. 2. Below, the left-right direction, the front-rear direction, and the up-down direction as indicated by arrows in FIG. 2 are used. The sewing machine 3 can sew the embroidery pattern representing the image that is the photo or the like, on the basis of the embroidery data. The sewing machine 3 includes a bed portion 30, a pillar 36, an arm portion 38, and a head portion 39. The bed portion 30 is a base of the sewing machine 3 and is long in the left-right direction. The pillar 36 extends upward from the right end portion of the bed portion 30. The arm portion 38 extends to the left from the upper end portion of the pillar 36. The head portion 39 extends downward from the left end portion of the arm portion 38. A needle bar 35 is provided on the lower end portion of the head portion 39. A sewing needle 44 is mounted on the needle bar 35.

A carriage 42 is provided on the bed portion 30. An embroidery frame 41 is mounted on the carriage 42. The embroidery frame 41 holds a work cloth. A Y direction movement mechanism (not shown in the drawings) is housed in the carriage 42. An X direction movement mechanism (not shown in the drawings) is housed inside the bed portion 30. The embroidery frame 41 is moved to a needle drop point by the Y direction movement mechanism and the X direction movement mechanism. The needle drop point is a predetermined position at which the sewing needle 44 pierces the work cloth, and is indicated using an XY coordinate system that is unique to the sewing machine 3. The embroidery pattern is formed on the work cloth as a result of the needle bar 35 and a shuttle mechanism (not shown in the drawings) being driven in synchronization with the movement of the embroidery frame 41. A CPU (not shown in the drawings) is built into the sewing machine 3. The CPU of the sewing machine 3 controls the Y direction movement mechanism, the X direction movement mechanism, the needle bar 35, and the like, on the basis of the embroidery data. The embroidery data indicates the coordinates of the needle drop points for forming the stitches of the embroidery pattern, a sewing order, and thread colors to be used in the sewing of the embroidery pattern (hereinafter referred to as "thread colors to be used").

A memory card slot 37 is installed in a side surface of the pillar 36. The memory card 55 can be inserted into and removed from the memory card slot 37. For example, the sewing machine 3 sews the embroidery pattern on the basis of the embroidery data generated by the embroidery data generation device 1 in the following manner. When the embroidery data is generated by the embroidery data generation device 1, the embroidery data is stored in the memory card 55 via the memory card connector 23. The memory card 55 is inserted into the memory card slot 37. The CPU of the sewing machine 3 reads out the embroidery data from the memory card 55. The CPU of the sewing machine 3 controls the sewing of the embroidery pattern on the basis of the read out embroidery data.

The main processing will be explained while giving a specific example, as appropriate, with reference to FIG. 3 to FIG. 9. When a user inputs a start command to start the main processing, the CPU 11 acts as a processor, reads out the embroidery data generation program from the program storage area 153, and executes the embroidery data generation program. The main processing is started in this way.

Figure 3:
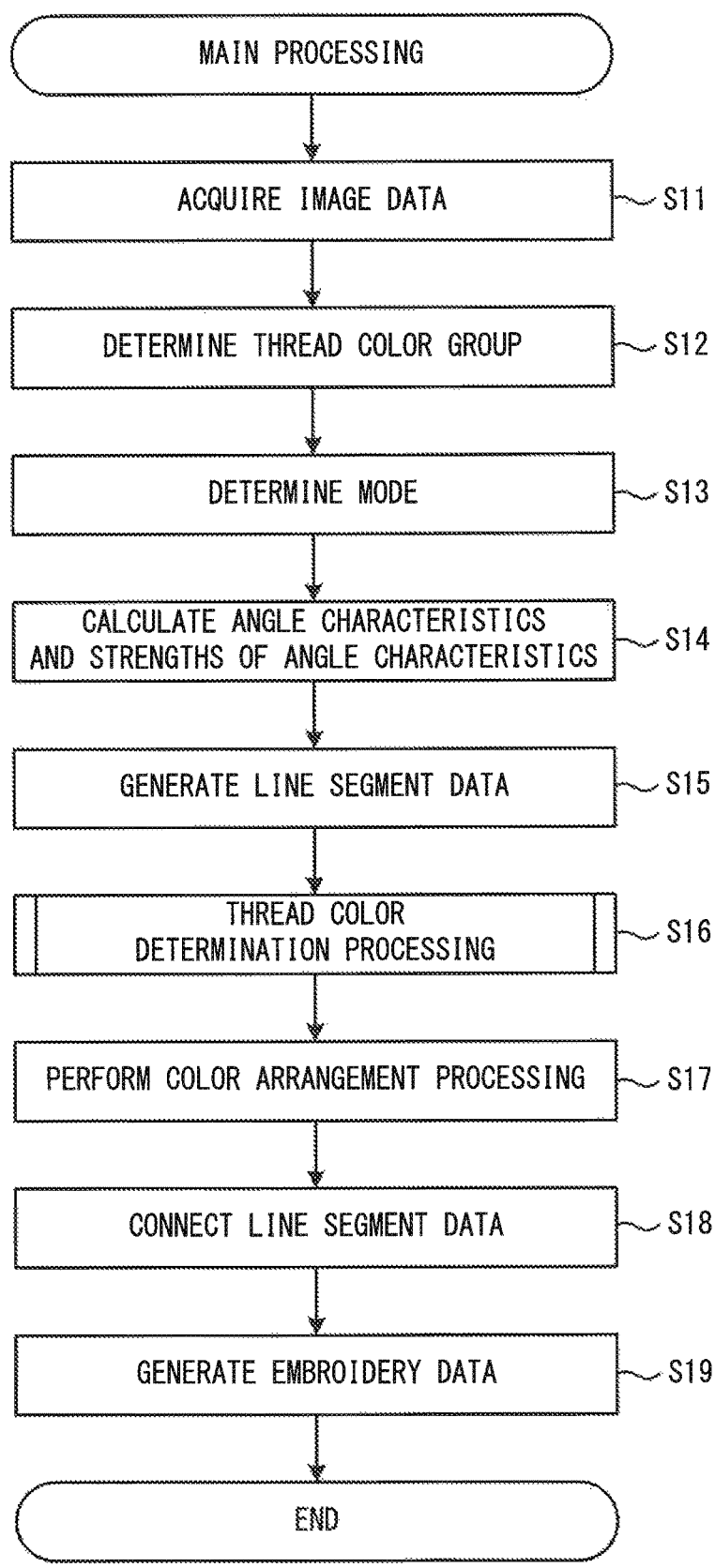
FIG. 3 is a flowchart of main processing.

As shown in FIG. 3, the CPU 11 acquires image data of an image (hereinafter referred to as a "source image") that is the source of the embroidery data generation (step S11). The image data of the source image indicates a color of each of the pixels configuring the source image using L*a*b* values. The image data may indicate the color of each of the pixels using another format (such as RGB values). The CPU 11 can acquire the image data of the source image using a variety of methods. For example, the CPU 11 may acquire the image data by reading the source image using the image scanner 25. The CPU 11 may acquire the image data from the image data storage area 151. The CPU 11 may acquire the image data from an external device, via the network 114. The CPU 11 may acquire the image data from a medium, such as the memory card 55.

The user selects one of a plurality of thread color groups in accordance with the thread set to be used in the sewing of the embroidery pattern. The CPU 11 determines the thread color group selected from the plurality of thread color groups (step S12). Hereinafter, the stored thread colors that are associated with the thread color group determined at step S12 are referred to as "target thread colors." The target thread colors match all the thread colors in the thread set to be used by the user. By determining the thread color group at step S12, a plurality of the target thread colors are determined.

A plurality of modes are provided in the embroidery data generation device 1. Specifically, the plurality of modes include a basic mode, a scenery mode, a night-scene mode, and a portrait mode. The plurality of modes determine a tendency in the thread colors to be used. The user selects one of the plurality of modes, in accordance with the category of the source image, for example. The CPU 11 determines the mode selected from among the plurality of modes (step S13). Hereinafter, the mode determined at step S13 is referred to as a "target mode."

On the basis of the acquired image data, the CPU 11 calculates an angle characteristic and a strength of the angle characteristic for each of the plurality of pixels configuring the source image (step S14). The angle characteristic is information indicating a direction in which continuity of a color in the image is high. The strength of the angle characteristic is information indicating a magnitude of a change in the color. For example, the CPU 11 can calculate the angle characteristics and the strengths of the angle characteristics using a method disclosed in Japanese Laid-Open Patent Publication No. 2001-259268. The CPU 11 may calculate the angle characteristics and the strengths of the angle characteristics using another method.

On the basis of the calculated angle characteristics and strengths of the angle characteristics, the CPU 11 generates line segment data and stores the line segment data in the RAM 12 (step S15). Each of the pieces of line segment data is configured by an angle component, a length component, and a color component, and specifies a line segment that finally becomes a stitch of the embroidery data. The CPU 11 can generate the line segment data using a method disclosed in Japanese Laid-Open Patent Publication No. 2001-259268, for example. The CPU 11 may generate the line segment data using another method. At step S15, the calculated angle characteristic is set as the angle component of the line segment data, and a fixed value that is set in advance is set as the length component of the line segment data. A value input by the user may be set as the length component of the line segment data. The CPU 11 performs thread color determination processing (step S16). In the thread color determination processing, the thread colors to be used are determined, in order to set the color component of the line segment data.

Figure 4:
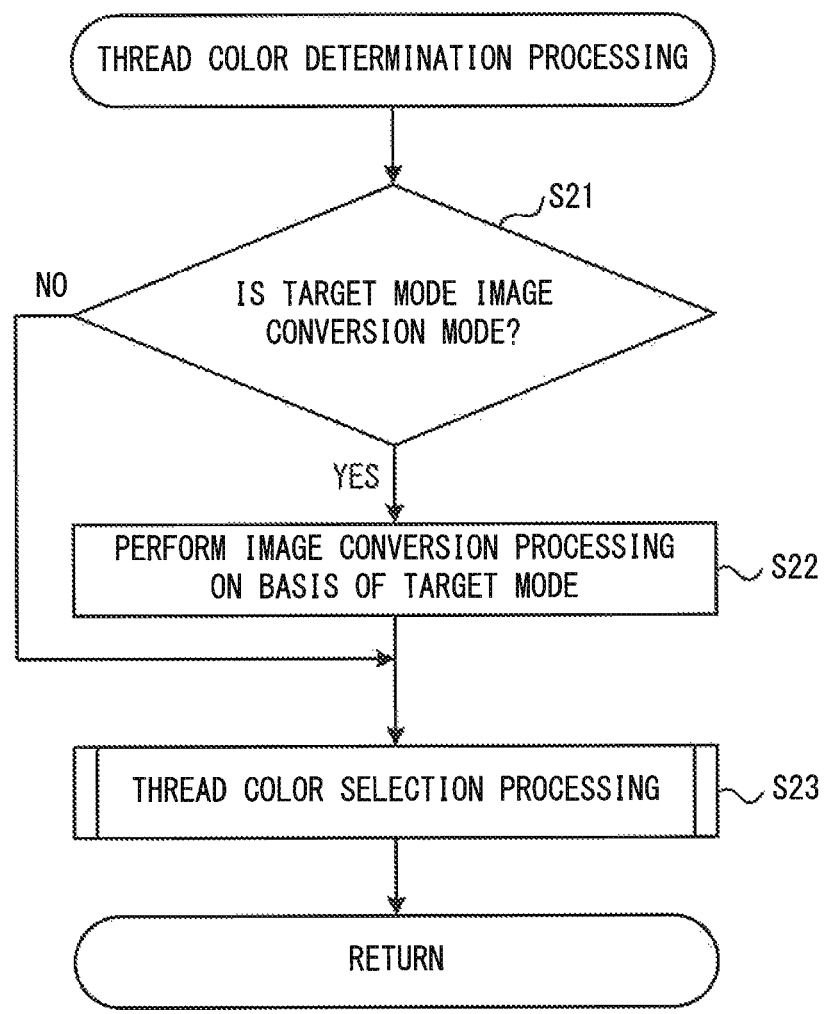
FIG. 4 is a flowchart of thread color determination processing.

The thread color determination processing will be explained in detail with reference to FIG. 4. The plurality of modes include an image conversion mode and a normal mode. The image conversion mode is a mode in which the image data of the source image is converted under predetermined conditions, and the thread colors to be used are determined on the basis of the converted image data. The normal mode is a mode in which the image data of the source image is not converted, and the thread colors to be used are determined on the basis of the image data as it is. In the present embodiment, the image conversion mode includes the scenery mode, the night-scene mode, and the portrait mode, and the normal mode includes the basic mode. The CPU 11 determines whether the target mode is the image conversion mode (step S21).

When the target mode is the normal mode (no at step S21), the CPU 11 advances the processing to step S23. When the target mode is the image conversion mode (yes at step S21), the CPU 11 performs image conversion processing on the basis of the target mode (step S22). In each of the modes included in the image conversion mode, a type of parameter relating to the image (contrast, luminance, brightness, saturation, hue, and the like) and a change amount of the parameter are associated with each other. For example, in the portrait mode, contrast is the type of parameter, and is associated with a 10% increase as the change amount of the parameter. In the image conversion processing, the CPU 11 converts the image data, on the basis of the image data of the source image, by changing the type of parameter associated with the target mode in accordance with the change amount. For example, when the target mode is the portrait mode, the CPU 11 converts the image data, on the basis of the image data of the source image, by increasing the contrast value by 10%. Hereinafter, the image represented by the image data after conversion by the image conversion processing is referred to as a "converted image." The CPU 11 performs thread color selection processing (step S23). In the thread color selection processing, the thread colors to be used are selected in accordance with predetermined conditions.

The thread color selection processing will be explained in detail with reference to FIG. 5. The CPU 11 performs use frequency identification processing (step S31). In the use frequency identification processing, the CPU 11 identifies a use frequency of the thread color corresponding to each of the colors of the plurality of pixels configuring the image, among the plurality of target thread colors. When the target mode is the normal mode, the source image is used in the identification of the use frequencies. When the target mode is the image conversion mode, the converted image is used in the identification of the use frequencies. The CPU 11 can identify the use frequencies using a method disclosed in Japanese Laid-Open Patent Publication No. 2014-83339, for example. Specifically, from among the plurality of target thread colors, the CPU 11 replaces the color of each of the pixels with one of the thread colors that is closest to the color of the pixel. For each of the target thread colors, the CPU 11 counts a number of the pixels corresponding to the target thread color. The CPU 11 identifies the use frequency of each of the target thread colors that have been substituted, by using the number of pixels counted for each of the target thread colors as the use frequency. The CPU 11 may identify the use frequencies using another method.

The CPU 11 sets a number of the thread colors to be used (hereinafter referred to as a "use number S") (step S32). The use number S is an integer equal to or less than a total number of the target thread colors, and is stored in the RAM 12. The use number S is, for example, determined in advance while taking into account a frequency of embroidery thread replacement and the like. The CPU 11 may set a value stored in the setting value storage area 154 as the use number S, or may set a value input by the user as the use number S. The user inputs, for example, the thread color that he or she definitely wants to use, from among the plurality of target thread colors. The CPU 11 receives the at least one thread color (hereinafter referred to as a "specific thread color") input by the user, and stores the at least one thread color in the RAM 12 in a predetermined order (step S33). At this time, the CPU 11 sets a number of the received specific thread colors (hereinafter referred to as a "specific number T") (step S33). The specific number T is an integer that is equal to or less than the use number S, and is stored in the RAM 12. When the thread color is not input by the user, the CPU 11 does not receive the specific thread color and sets zero as the specific number T, then advances the processing to step S34. The CPU 11 sets a variable X to 1 (step S34). The variable X is counted each time the thread color to be used is selected and is stored in the RAM 12.

The CPU 11 determines Whether the variable X has exceeded the specific number T (step S35). When the variable X is equal to or less than the specific number T (no at step S35), this means that there are the specific thread colors that are not selected, at step S36 (to be described later) as the thread colors to be used, and the CPU 11 advances the processing to step S36. The CPU 11 selects the X-th specific thread color in the order stored in the RAM 12 at step S33 as the X-th color of the thread colors to be used, and stores the X-th specific thread color in the RAM 12 (step S36). The CPU 11 adds 1 to the variable X (step S37). When the variable X has exceeded the specific number T (yes at step S35), this means that all of the received specific thread colors have been selected as the thread colors to be used, and the CPU 11 advances the processing to step S41.

The CPU 11 executes thread color priority identification processing (step S41). In the thread color priority identification processing, the priority information 100 is referred to and a priority (hereinafter referred to as a "thread color priority") to be selected as the thread color to be used is identified for each of the plurality of target thread colors.

The priority information 100 will be explained with reference to FIG. 6. The priority information 100 includes basic priority information 101, scenery priority information 102, night-scene priority information 103, and portrait priority information 104. The basic priority information 101, the scenery priority information 102, the night-scene priority information 103, and the portrait priority information 104 are respectively associated with the basic mode, the scenery mode, the night-scene mode, and the portrait mode.

The priority information 100 includes information indicating a plurality of color regions. The plurality of color regions are defined by the L*a*b* color space. Specifically, in the L*a*b* color space, each of the color regions is classified into achromatic colors and chromatic colors. The achromatic colors are classified into color regions of five stages according to brightness. The hues of the chromatic colors are classified into the six RGBCMY colors (red (R), green (G), blue (B), cyan (C), magenta (M), and yellow (Y)). The chromatic colors of each hue are classified into color regions of three stages of "high," "medium," and "low," according to the brightness, and also classified into color regions of three stages of "high," "medium," and "low," according to saturation. Thus, the chromatic colors of each of the hues are classified into nine color regions. In this way, since there are the five color regions of the achromatic colors and the nine color regions for each of the hues of the six chromatic colors, a total of 59 (5+6×9) color regions are defined in the L*a*b* color space.

Below, each of the color regions of the achromatic colors are defined as color regions A, B, C, D, and E, in a direction in which the brightness becomes lower, from white to black. In other words, the color region A is white, and the color region E is black. Each color region of the chromatic colors of each of the hues is defined by color regions F, G, H, I, J, K, M, and N, in order in which brightness/saturation is high/low, high/medium, high/high, medium/low, medium/medium, medium/high, low/low, low/medium, and low/high. The brightness of the color region A is highest, among the brightnesses of the color regions A to N. The brightness of the color region E is the lowest, among the brightnesses of the color regions A to N.

The priority information 100 indicates the thread color priority on the basis of the saturation, the brightness, and the hue of each of the thread colors. More specifically, the priority information 100 includes information establishing a region priority and a hue priority. The region priority is an order of priority in which each of the color regions A to N is selected as a target region to be described later. The hue priority is an order of priority in which, when one of the color regions of the chromatic colors is selected as the target region, each of the hues RGBCMY is selected as a target hue to be described later. By referring to the priority information 100, the CPU 11 identifies the thread color priority for each of the plurality of target thread colors, in accordance with the region priority and the hue priority. In each of the basic priority information 101, the scenery priority information 102, the night-scene priority information 103, and the portrait priority information 104, the hue priority is set to become lower in order of the hues R, Y, G, C, B, and M.

In the basic priority information 101, the order of priority is set such that the region priority becomes lower in the order of the color regions A, E, K, C, I, J, H, B, F, G, N, D, L, and M. In the basic priority information 101, in each of the color regions of the chromatic colors having the same brightness, the region priority is lowest for the color region for which the saturation is "medium." In each of the color regions of the chromatic colors having the same saturation, the region priority is highest for the color region for which the brightness is "medium." In the scenery priority information 102, the order of priority is set such that the region priority becomes lower in the order of the color regions A, D, J, C, I, K, B, G, F, H, M, L, and N. In the scenery priority information 102, the region priority is not set for the color region E. In the scenery priority information 102, the region priority of the color region E may be set to be the lowest priority. In the night-scene priority information 103, the order of priority is set such that the region priority becomes lower in the order of the color regions A, E, C, N, M, L, D, H, G, F, B, K, J, and I. In the night-scene priority information 103, in each of the color regions of the chromatic colors having the same brightness (the color regions F, G, and H, for example), the region priority of the color region for which the saturation is high is higher than the region priority of the color region for which the saturation is low. In the portrait priority information 104, the order of priority is set such that the region priority becomes lower in the order of the color regions A, E, F, B, G, H, I, C, J, L, D, M, K, and N. In the portrait priority information 104, in each of the color regions of the chromatic colors having the same brightness, the region priority of the color region for which the saturation is low is higher than the region priority of the color region for which the saturation is high. In each of the color regions of the chromatic colors having the same saturation, the region priority of the color region for which the brightness is low is higher than the region priority of the color region for which the brightness is high.

The thread color priority identification processing will be explained in detail with reference to FIG. 6 to FIG. 9. As shown in FIG. 7, the CPU 11 acquires the priority information 100 (refer to FIG. 6) associated with the target mode (step S51). The CPU 11 refers to the acquired priority information 100 as appropriate, using the following processing. The CPU 11 sets a variable Z to 1 (step S52). The variable Z indicates a ranking of the thread color priority set for the thread colors in processing at step S56 or step S63 to be described later, and is stored in the RAM 12. The CPU 11 sets a variable V to 1 (step S53). The variable V indicates each of the color regions A to N in descending order of their region priority, and is stored in the RAM 12. The color region corresponding to the variable V is the target region.

The CPU 11 determines whether the target region is one of the achromatic color regions A to E (step S54). When the target region is one of the achromatic color regions A to E (yes at step S54), the CPU 11 determines whether the target thread color belonging to the target region (excluding the specific thread color) is present (step S55). When the target thread color belonging to the target region is not present (no at step S55), the CPU 11 advances the processing to step S67. When the target thread color belonging to the target region is present (yes at step S55), the CPU 11 sets that target thread color as the thread color whose thread color priority is Z-th from the top, and stores that target thread. color in the RAM 12 (step S56). The CPU 11 adds 1 to the variable Z (step S57). The CPU 11 advances the processing to step S67.

When the target region is one of the chromatic color regions F to N (no at step S54), the CPU 11 sets a variable W to 1 (step S61). The variable W indicates each of the RGBCMY hues in descending order of their hue priority, and is stored in the RAM 12. The hue corresponding to the variable W is the target hue. In the present embodiment, the priority ranking of the hue priority does not change in any of the types of priority information 100, and thus, the variables W from 1 to 6 in that order respectively correspond to the hues R, Y, G, C, B, and M. The CPU 11 determines whether the target thread color belonging to the target region of the target hue (excluding the specific thread color) is present (step S62). When the target thread color belonging to the target region of the target hue is not present (no at step S62), the CPU 11 advances the processing to step S65. When the target thread color belonging to the target region of the target hue is present (yes at step S62), the CPU 11 sets that target thread color as the thread color whose thread color priority is Z-th from the top, and stores that target thread color in the RAM 12 (step S63). The CPU 11 adds 1 to the variable Z (step S64).

The CPU 11 adds 1 to the variable W (step S65). The CPU 11 determines whether the variable W has exceeded a total number of the hues classifying the chromatic colors (hereinafter referred to as a "number of hues R") (step S66). In the present embodiment, the number of hues R is 6. When the variable W is equal to or less than the number of hues R (no at step S66), this means that, for the target region, there is a hue the which the determination has not been made as to whether the belonging target thread color is present, and thus the CPU 11 returns the processing to step S62.

When the variable W exceeds the number of hues R (yes at step S66), this means that the determination has been made as to whether the belonging target thread color is present, for all of the hues RGBCMY of the current target region, and thus the CPU 11 advances the processing to step S67. The CPU 11 adds 1 to the variable V (step S67). The CPU 11 determines whether the variable V exceeds a total number of the color regions A to N (hereinafter referred to as a "number of regions Q") (step S68). In the present embodiment, the number of regions Q is 14. When the variable V is equal to or less than the number of regions Q (no at step S68), this means that there is the color region for which the determination has not been made as to whether the belonging target thread color is present, and thus the CPU 11 returns the processing to step S54. When the variable V exceeds the number of regions Q (yes at step S68), this means that the determination has been made as to whether the belonging target thread color is present, for all of the color regions A to N. Therefore, the CPU 11 returns the processing to the thread color selection processing (refer to FIG. 5).

Figure 5:
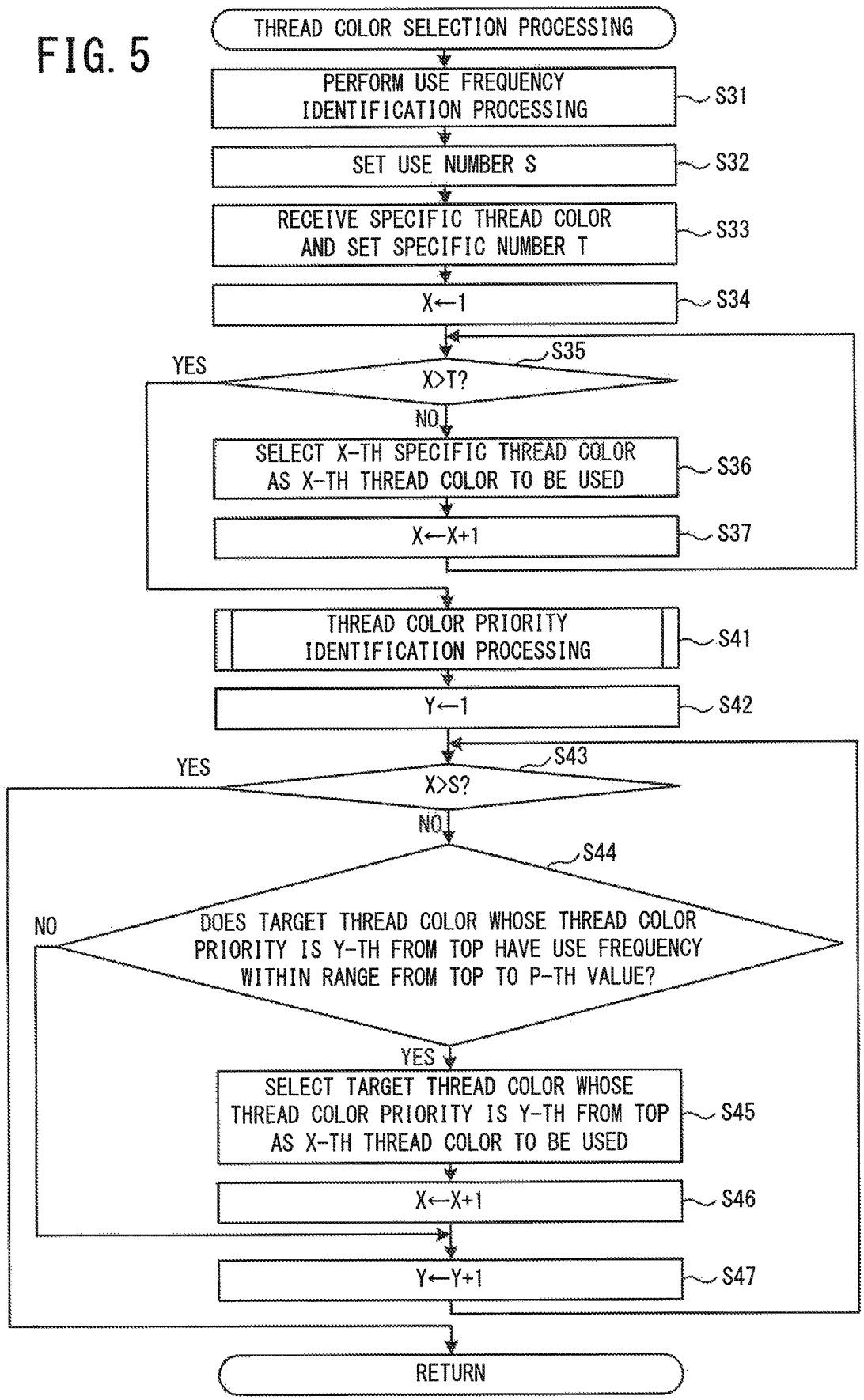
FIG. 5 is a flowchart of thread color selection processing.

As shown in FIG. 5, the CPU 11 sets a variable Y to 1 (step S42). The variable Y indicates a ranking, in descending order, of the identified thread color priority, and is stored in the RAM 12. The CPU 11 determines whether the variable X has exceeded the use number S (step S43). When the variable X is equal to or less than the use number S (no at step S43), the CPU 11 determines, from among the plurality of target thread colors, whether the target thread color whose thread color priority is Y-th from the top has a use frequency that is within a range from a top value to a P-th value (step S44). P is an integer that is smaller than the use number S, and is stored in the RAM 12. The CPU 11 may set a value stored in the setting value storage area 154 as P, or may set a value input by the user as P. P is preferably set on the basis of a distribution of the target thread color in each of the color regions A to N.

When the target thread color whose thread color priority is Y-th from the top does not have the use frequency within the range from the top to the P-th value (no at step S44), the CPU 11 advances the processing to step S47. In this case, the use frequency of the target thread color that is not within the range from the top to the P-th value is zero or is low, and the target thread color is thus not selected as the thread color to be used. When the target thread color whose thread color priority is Y-th from the top has the use frequency within the range from the top to the P-th value (yes at step S44), the CPU 11 selects the target thread color whose thread color priority is Y-th from the top as the X-th thread color to be used, and stores the X-th thread color to be used in the RAM 12 (step S45). The CPU 11 adds 1 to the variable X (step S46). The CPU 11 adds 1 to the variable Y (step S47). The CPU 11 returns the processing to step S43. When the variable X has exceeded the use number S (yes at step S43), this means that the thread colors to be used corresponding to the use number S set at step S32 have been selected. Thus, the CPU 11 returns the processing to the thread color determination processing (refer to FIG. 4), and returns to the main processing (refer to FIG. 3).

Processing to select a number of thread colors to be used corresponding to the use number S will be explained specifically with reference to FIG. 5 to FIG. 9, taking as an example a case in which the target mode is the basic mode. In FIG. 8 and FIG. 9, the target thread color is indicated by a thread color No. It is assumed that, at step S32, 10 is set as the use number S, as shown in FIG. 5. It is assumed that, at step S33, a target thread color (thread color No. 205) of a color region K of a hue Y, and a target thread color (thread color No. 027) of a color region I of a hue G, are received as the specific thread colors. In this case, 2 is set as the specific number T. As shown in FIG. 5 and FIG. 8, the CPU 11 set the variable X to 1 (step S34), and sets the target thread color of the thread color No. 205 as the first thread color to be used (no at step S35; step S36). When the variable X becomes 2 (step S37; no at step S35), the CPU 11 sets the target thread color of the thread color No. 027 as the second thread color to be used (step S36). When the variable X becomes 3 (step S37) and exceeds the specific number T that is 2 (yes at step S35), the thread color priority processing is performed (step S41).

Figure 6:
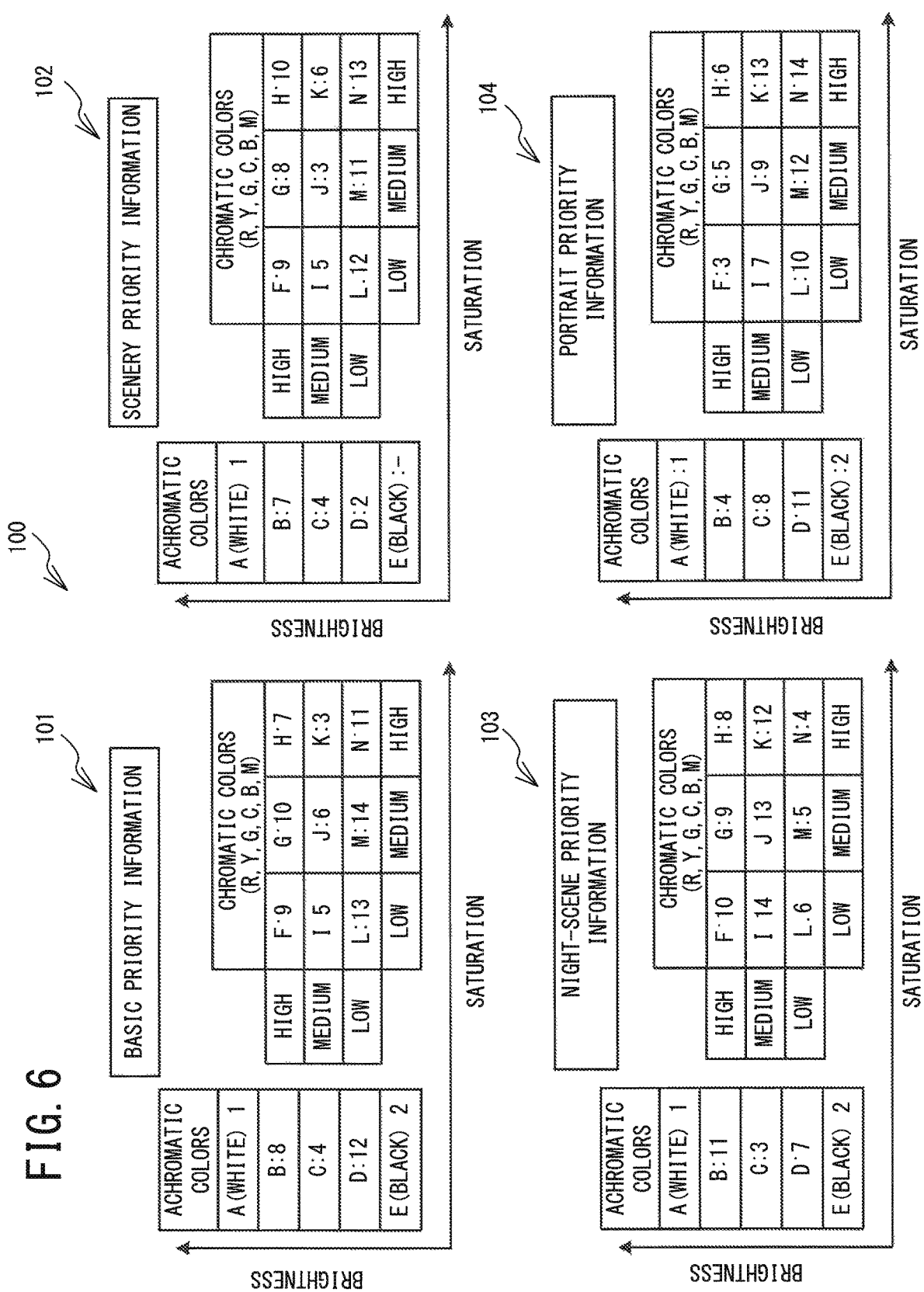
FIG. 6 is a schematic view of priority information 100.
Figure 7:
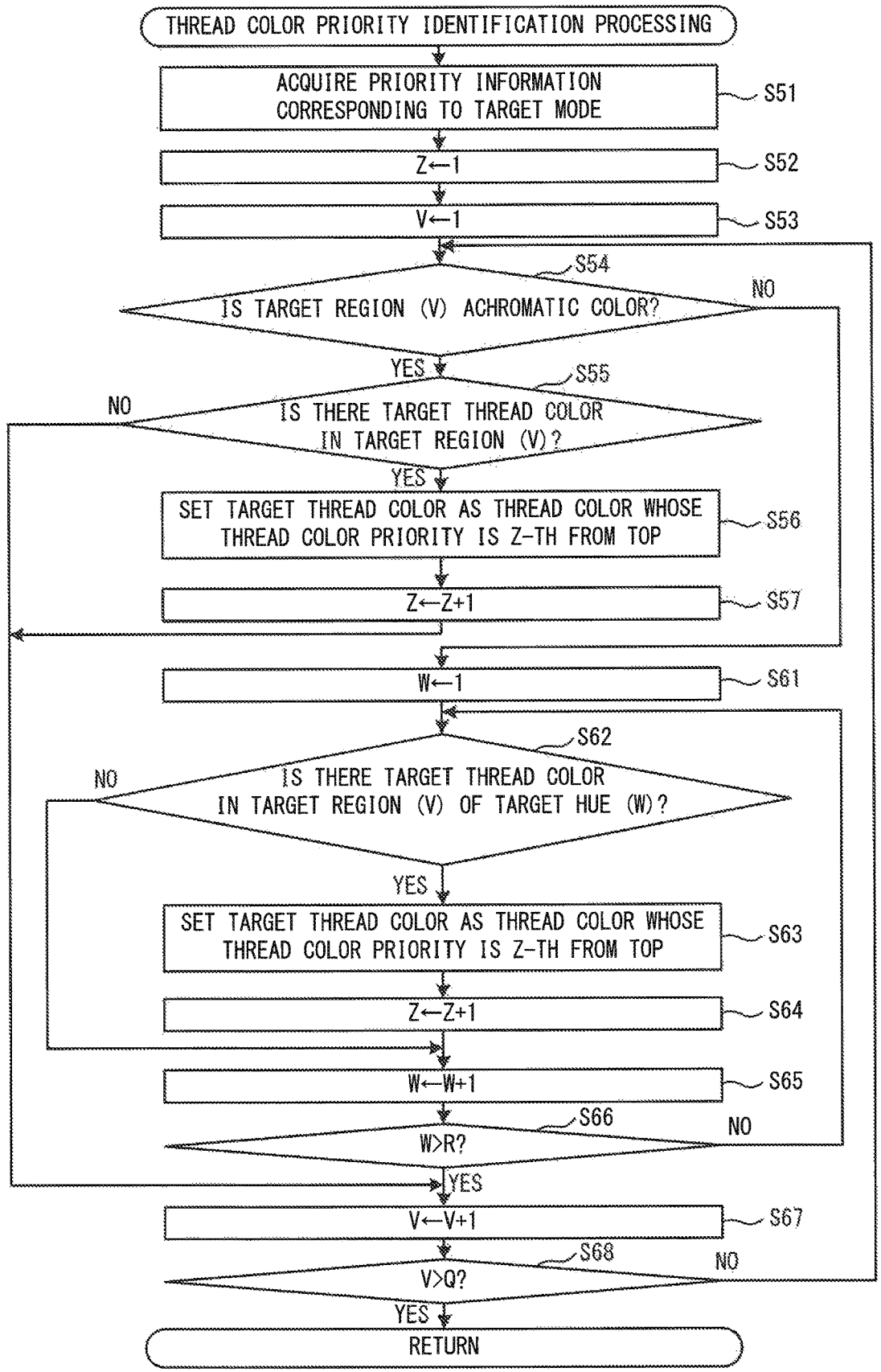
FIG. 7 is a flowchart of thread color priority identification processing.

As shown in FIG. 6 and FIG. 7, the CPU 11 acquires the basic priority information 101 that is associated with the basic mode (step S51). The CPU 11 sets each of the variables Z and V to 1 (step S52, step S53). The CPU 11 refers to the basic priority information 101 and specifies the color region A, which has the highest region priority, as the target region. The color region A belongs to the achromatic colors (yes at step S54). As shown in FIG. 7 and FIG. 9, the CPU 11 sets the target thread color belonging to the color region A (thread color No. 001) as the thread color whose thread color priority is first from the top (yes at step S55; step S56). When each of the variables Z and V becomes 2 (step S57; step S67; no at step S68), the CPU 11 sets the target thread color of the thread color No. 900 as the thread color whose thread color priority is second from the top (yes at step S54; yes at step S55; step S56).

As shown in FIG. 6 and FIG. 7, when each of the variables Z and V becomes 3 (step S57; step S67; no at step S68), the CPU 11 refers to the basic priority information 101 and specifies the color region K, which has the third highest region priority, as the target region. The color region K belongs to the chromatic colors (no at step S54). The CPU 11 sets the variable W to 1 (step S61). The CPU 11 refers to the basic priority information 101 and sets the hue R, which has the highest hue priority, as the target hue. As shown in FIG. 7 and FIG. 9, the CPU 11 sets the target thread color (thread color No. 800) belonging to the color region K (the target region) of the hue R (the target hue) as the thread color whose thread color priority is third from the top (yes at step S62 step S63).

As shown in FIG. 6 and FIG. 7, when the variables Z and W become 4 and 2, respectively (step S64; step S65; no at step S66), the CPU 11 refers to the basic priority information 101 and sets the hue Y, which has the second highest hue priority, as the target hue. As shown in FIG. 7 and FIG. 9, the target thread color (thread color No. 205) belonging to the color region K (the target region) of the hue Y (the target hue) is the specific thread color, and is already selected as the thread color to be used. Thus, the CPU 11 does not set the specific thread color of the thread color No. 205 as the thread color whose thread color priority is fourth from the top (no at step S62). After that, the CPU 11 repeats the processing from step S62 to step S65 until the variable W exceeds 6, which is the number of hues R (yes at step S66), and repeats the processing at step S54 to step S67 until the variable V exceeds 14, which is the number of regions Q (yes at step S68). In this way, as shown in the example in FIG. 9, when the thread color priority is identified for each of the plurality of target thread colors, the processing returns to the thread color selection processing.

As shown in FIG. 5 and FIG. 9, the CPU 11 sets the variable Y to 1 step S42). Since, the current variable X is 3 and does not exceed 10, which is the use number S (no at step S43), the CPU 11 determines, for the target thread color (thread color No. 001) whose thread color priority is first from the top, whether the use frequency is within the range from the top to the P-th. value (step S44). The use frequency of the target thread color of the thread color No. 001 is assumed to be within the range from the top to the P-th value (yes at step S44). In this case, as shown in FIG. 5 and FIG. 8, the CPU 11 selects the target thread color of the thread color No. 001 as the third thread color to be used (step S45).

As shown in FIG. 5 and FIG. 9, when the variables X and Y become 4 and 2, respectively, (step S46; step S47; no at step S43), the CPU 11 determines, for the target thread color (thread color No. 900) whose thread color priority is second from the top, whether the use frequency is within the range from the top to the P-th value (step S44). The use frequency of the target thread color of the thread color No. 900 is assumed to not be within the range from the top to the P-th value (no at step S44). In this case, as shown in FIG. 5 and FIG. 8, the CPU 11 does not select the target thread color of the thread color No. 900 as the fourth thread color to be used. The variable X remains at 4, and the variable Y becomes 3 (step S47). After that, the CPU 11 repeats the processing at step S44 to step S47 until the variable X exceeds 10, which is the use number S (yes at step S43). In this way, as in the example shown in FIG. 8, the thread colors to be used of the ten colors corresponding to the use number S are selected. Information about the thread colors to be used of the selected ten colors corresponding to the use number S is stored in the RAM 12.

As shown in FIG. 3, on the basis of the image data acquired at step S11 or the image data converted at step S22, the CPU 11 performs processing to generate the embroidery data used to form, using the sewing machine 3, the stitches of the number of thread colors corresponding to the use number S determined in the thread color determination processing (step S17 to step S19). The CPU 11 can perform the processing at step S17 to step S19 using a method disclosed in Japanese Laid-Open Patent Publication No. 2001-259268, for example.

Specifically, the CPU 11 performs color arrangement processing (step S17). In the color arrangement processing, the color component of the line segment data generated at step S15 is set. On the basis of the image data, the CPU 11 selects one color that reflects a color of the image, from among the thread colors to be used that correspond to the use number S and that are determined in the thread color determination processing, and determines the selected color as the color of that line segment. When the target mode is the normal mode, the image data of the source image is used in the color arrangement processing. When the target mode is the image conversion mode, the image data of the converted image is used in the color arrangement processing. The color of the line segment becomes the color of the stitch.

Among the plurality of line segments for which the color arrangement has been performed, the CPU 11 sequentially connects the line segments having the same thread color to be used (step S18). Specifically, the CPU 11 uses two endpoints of the line segment as the start point and the end point of the stitch, respectively, and causes an endpoint of a second line segment that is closest to an end point of a first line segment and that is the same thread color to be used to become the start point of the next stitch. By repeating this processing, the CPU 11 connects the line segments. In this way, the CPU 11 generates line segment data for each of the thread colors to be used.

The CPU 11 generates the embroidery data on the basis of the generated line segment data of the thread colors to be used (step S19). The CPU 11 calculates the coordinates of the needle drop points by converting coordinates of the endpoints of each of the line segments to coordinates of the XY coordinate system that is unique to the sewing machine 3. The CPU 11 causes an order of connection of the line segments to be a sewing order of the needle drop points. As described above, the CPU 11 generates the embroidery data that represents the coordinates of the needle drop points, the sewing order, and the thread colors to be used. The CPU 11 may generate the embroidery data using another method. The CPU 11 ends the main processing.

As described above, the CPU 11 acquires the image data of the source image. The user selects one of the plurality of modes, in accordance with the category of the source image.

The CPU 11 determines the selected mode as the target mode. Since the different region priority is set for each of the modes, even when the acquired image data is the same, on the basis of the target mode, the CPU 11 selects the plurality of thread colors among which at least one of the thread colors is different for each mode, as the plurality of thread colors to be used. The CPU 11 generates the embroidery data to form, using the sewing machine 3, the stitches of the selected plurality of thread colors to be used. As a result, the embroidery data generation device 1 can generate the embroidery data to form the embroidery pattern representing the color tone that accords with the category of the source image.

Among the plurality of stored thread colors, thread colors are present that are not included in the thread set to be used in the sewing of the embroidery pattern by the user. The user selects one of the plurality of thread color groups in accordance with the thread set that is to be used in the sewing of the embroidery pattern. The CPU 11 determines the thread color group selected from among the plurality of thread color groups. In the selected thread color group, the plurality of stored thread colors included in the thread set are associated with the plurality of target thread colors. The CPU 11 selects the number of thread colors to be used corresponding to the use number S, from the plurality of target thread colors. As a result, the embroidery data generation device 1 can avoid the thread colors that are not included in the thread set to be used in the sewing of the embroidery pattern from being selected by the user, as the thread colors to be used.

The priority information 100 is associated with each of the plurality of modes. The priority information 100 indicates the thread color priority that is different for at least one of the target thread colors. The embroidery data generation device 1 can set the priority information 100 so as to identify the thread color priority in accordance with the category of the image, for example, for the plurality of target thread colors. The CPU 11 identifies the thread color priority for each of the plurality of target thread colors on the basis of the priority information 100 associated with the target mode. The CPU 11 selects the thread colors to be used corresponding to the use number S, from among the plurality of target thread colors, in accordance with the identified thread color priority. As a result, the embroidery data generation device 1 can select, as the thread colors to be used, the thread colors that accord with the target mode, by selecting the thread colors to be used in accordance with the thread color priority indicated by the priority information 100.

The CPU 11 refers to the priority information 100 and identifies the region priority on the basis of the brightness and the saturation of the thread color. The CPU 11 refers to the priority information 100 and identifies the hue priority on the basis of the hue of the thread color. For each of the plurality of target thread colors, the CPU 11 identifies the thread color priority on the basis of the identified hue priority and region priority. Thus, the embroidery data generation device 1 can suppress the occurrence of bias occurring in the colors of the thread colors to be used, compared to a case in which the thread color priority is identified in descending order of the use frequency, for example.

When a human figure or the like is included in the source image, there is a case in which the embroidery pattern is represented by the color tone that accords with the category of the source image, by using more of the thread colors having a low saturation (thread colors of so-called pastel colors) than the thread colors having a high saturation. The portrait priority information 104 is associated with the portrait mode. In the portrait priority information 104, of each of the color regions F to N of the chromatic colors, in the color regions to which the thread colors having the same brightness belong, the region priority of the color regions to which the thread colors having the low saturation belong is set to be higher than the region priority of the color regions to which the thread colors having the high saturation belong. According to this, when the portrait priority information 104 is acquired at step S51, among the plurality of target thread colors, in the plurality of thread colors of the chromatic colors having the same brightness, the thread color priority of the thread colors having the low saturation is indicated as being higher than the thread color priority of the thread colors having the high saturation. Thus, the embroidery data generation device 1 can select, as the thread colors to be used, the target thread colors of the color tone that accords with the category of the source image, when a human figure or the like is included in the source image.

When the source image represents a night scene or the like, there is a case in which the embroidery pattern is represented by the color tone that accords with the category of the source image, by using more of the thread colors having the high saturation than the thread colors having the low saturation. The night-scene priority information 103 is associated with the night-scene mode. In the night-scene priority information 103, of each of the color regions F to N of the chromatic colors, in the color regions to which the thread colors having the same brightness belong, the region priority of the color regions to which the thread colors having the high saturation belong is set to be higher than the region priority of the color regions to which the thread colors having the low saturation belong. According to this, when the night-scene priority information 103 is acquired at step S51, among the plurality of target thread colors, in the plurality of thread colors of the chromatic colors having the same brightness, the thread color priority of the thread colors having the high saturation is indicated as being higher than the thread color priority of the thread colors having the low saturation. Thus, the embroidery data generation device 1 can select, as the thread colors to be used, the target thread colors of the color tone that accords with the category of the source image, when the source image represents the night scene or the like.

When the source image represents scenery or the like, there is a case in which it is difficult to produce the embroidery pattern of the color tone that accords with the category of the source image, by using the thread colors of a minimum brightness. The scenery priority information 102 is associated with the scenery mode. In the scenery priority information 102, the region priority of the color region E is not set. The color region E is a color region to which the thread color having the minimum brightness belongs, of each of the color regions A to N. According to this, when the scenery priority information 102 is acquired at step S51, among the plurality of target thread colors, the thread color having the minimum brightness is excluded from selection candidates at step S45. Thus, when the source image represents scenery or the like, the embroidery data generation device 1 can avoid selecting, as the thread color to be used, the target thread color of the color tone that does not accord with the category of the source image.

The larger the use number S, the more accurately the embroidery pattern can represent the color tone of the source image. The smaller the use number S, the more a replacement frequency of the embroidery threads is suppressed, for example. The CPU 11 sets the use number S. The CPU 11 selects the thread colors to be use in accordance with the thread color priority, until the variable X exceeds the use number S. In other words, the CPU 11 selects the number of thread colors to be used corresponding to the set use number S, in accordance with the thread color priority. According to this, the user can set the use number S while taking into account a degree of accuracy of the embroidery pattern with respect to the color tone of the source image, the replacement frequency of the embroidery threads, and the like, for example. When it is not necessary that all of the plurality of target thread colors be selected as the thread colors to be used, for example, the embroidery data generation device 1 can suppress the use number S, in comparison to a case in which all of the plurality of target thread colors are always selected as the thread colors to be used.

The use number S is set, and thus, there is a case in which the target thread color having the low thread color priority is not selected as the thread color to be used, even if the use frequency is high. In this case, it is possible that the embroidery pattern cannot accurately represent the color tone of the source image. Among the plurality of target thread colors, the CPU 11 identifies the use frequency of the thread colors corresponding to the colors of each of the plurality of pixels configuring the source image or the converted image. For the target thread color whose thread color priority is Y-th from the top, the CPU 11 determines whether the use frequency is within the range from the top to the P-th value, among the plurality of target thread colors. In accordance with the thread color priority, the CPU 11 selects the number of the thread colors to be used corresponding to the use number S, from the thread colors whose use frequency is within the range from the top to the P-th value, among the plurality of target thread colors. According to this, the target thread colors whose use frequency is not within the range from the top to the P-th value are excluded from becoming selection candidates at step S45. Thus, the embroidery data generation device 1 can avoid selecting, as the thread color to be used, the target thread color whose use frequency is zero or is low even if the thread color priority is high, and can select, as the thread color to be used, the target thread color whose use frequency is high even if the thread color priority is low. As a result, the embroidery data generation device 1 can generate the embroidery data to form the embroidery pattern that can accurately represent the color tone of the source image, compared to a case in which the target thread color whose use frequency is zero or is low is selected as the thread color to be used.

From among the target thread colors, the CPU 11 receives the specific thread color as a result of the user inputting the thread color that he or she wishes to use, for example. The CPU 11 selects the received specific thread color as the thread color to be used, irrespective of the thread color priority. Thus, even if the target thread color having the low thread color priority is input as the specific thread color, the embroidery data generation device 1 can select the specific thread color as the thread color to be used. After selecting the thread colors to be used corresponding to the specific number T, the CPU 11 selects, in accordance with the thread color priority, a number of the thread colors to be used that corresponds to a difference between the use number S and the specific number T, from among the thread colors other than the specific thread colors, of the plurality of target thread colors. Thus, the embroidery data generation device 1 can select the number of thread colors to be used corresponding to the use number S obtained as a total at step S36 and step S45, even when the specific thread color has been received, and can avoid the specific thread color being selected in duplicate as the thread color to be used.

The type of parameter relating to the image and the change amount of the parameter are associated with each of the modes included in the image conversion mode. The CPU 11 converts the image data of the source image by causing the type of parameter associated with the target mode to change in accordance with the change amount. The converted image has a color tone that accords more with the category of the source image than the source image. Thus, the embroidery data generation device 1 can generate the embroidery data to form the embroidery pattern representing the color tone that further accords with the category of the source image.

Various modifications can be made to the present disclosure in addition to the above-described embodiment. A modified example of the priority information 100 will be explained with reference to FIG. 10. FIG. 10 shows basic priority information 201 as an example of the modified example of the priority information 100. Although the priority information 100 of the above-described embodiment corresponds to each of the modes, the priority information of the modified example corresponds to each of the thread color groups and to each of the modes. Thus, the basic priority information 201 corresponds to each of a predetermined one of the thread color groups and to the basic mode. Although the priority information 100 of the above-described embodiment sets the region priority and the hue priority, the priority information of the modified example sets the thread color priority. Specifically, in the basic priority information 201, the target thread color indicated by the thread color No. are arranged in order of the thread color priority. In this case, in the thread color priority identification processing, the CPU 11 omits the processing from step S52 onward, and can identify the thread color priority for each of the target thread colors simply by acquiring the priority information of the modified example corresponding to the thread color group determined at step S12 and to the target mode. Thus, the embroidery data generation device 1 can reduce a processing load to identify the thread color priority for each of the target thread colors, and can easily identify the thread color priority. When there is the specific thread color, the CPU 11 may exclude the specific thread color from the basic priority information 201.

The embroidery data generation device 1 may store both the priority information 100 of the above-described embodiment and the priority information of the modified example in the setting value storage area 154. Specifically, for predetermined thread color groups (thread color groups that are frequently selected, for example), the embroidery data generation device 1 stores the priority information of the modified example corresponding to each of the modes in the setting value storage area 154. However, for the other thread color groups (thread color groups that are not frequently selected, for example), the embroidery data generation device 1 need not necessarily store the priority information of the modified example. According to this, when one of the predetermined thread color groups is determined at step S12, at step S51, the CPU 11 may acquire only the priority information of the modified example corresponding to the predetermined thread color group and to the target mode. When one of the other thread color groups is determined at step S12, at step S51, the CPU 11 may acquire the priority information 100 of the above-described embodiment corresponding to the target mode, and may perform the processing from step S52 onward. Thus, the embroidery data generation device 1 can reduce the processing load to identify the thread color priority, while suppressing a volume of the priority information stored in the setting value storage area 154.

The plurality of the modes and the types of priority information 100 may be three or less, or may be five or more, respectively. In the priority information. 100, the plurality of color regions may be defined using an RGB color space or the like. Specifically, each of the color regions may be classified in accordance with RUB values or the like. Each of the color regions may be classified by the user. The achromatic colors may be classified into four or less or six or more color regions. The chromatic colors may be classified into eight or less or ten or more color regions. The hues of the chromatic colors may be classified into five colors or less, or seven colors or more. The hue priority of the RGBCMY hues may be different in each of the types of priority information 100.

In the above-described embodiment, each of the color regions is classified according to the saturation, the brightness, and the hue of the thread colors, and the thread color priority is identified on the basis of the region priority and the hue priority. In contrast to this, each of the color regions may be classified according to one or two of the saturation, the brightness, and the hue of the thread colors. Specifically, the thread color priority may be identified on the basis of one or two of the saturation, the brightness, and the hue of the thread colors.

The region priority and the hue priority may be respectively set by the user, and, with respect to the priority information of the above-described modified example, the thread color priority may be set by the user for each of the target thread colors. In this case, for example, there is a higher possibility that the target thread colors that accord with a color tone of the user's preference will be selected as the thread colors to be used. As a result, the embroidery data generation device 1 can generate the embroidery data to form the embroidery pattern representing the color tone that accords with the user's preference.

At step S13, the CPU 11 may determine the mode that accords with the category of the source image by analyzing the image data of the source image. At step S44, the CPU 11 may set a predetermined value as a reference use frequency, and may determine whether the use frequency exceeds the set value. In this case, the CPU 11 may set a value stored in the setting value storage area 154 as the predetermined value, or may set a value input by the user as the predetermined value.

The processing at step S21 and at step S22 may be omitted. Specifically, whichever of the modes is the target mode, the CPU 11 need not necessarily perform the image conversion processing. The processing at step S21 may be omitted. Specifically, whichever of the modes is the target mode, the CPU 11 may perform the image conversion processing on the basis of the target mode. The processing at step S31 and at step S44 may be omitted. Specifically, even when the use frequency is zero or is low, if the thread color priority is within a range from the top to the S-th value, the target thread color may be selected as the thread color to be used. In this case, the embroidery data generation device 1 can reduce a processing load to select the thread colors to be used. The processing at step S32, at step S33, and at step S35 to step S37 may be omitted. Between step S33 and step S34, for example, the CPU 11 may receive the target thread colors excluded from the selection candidates at step S45. In the above-described embodiment, the plurality of thread color groups are provided in the embroidery data generation device 1, but the number of thread color groups may be one. In this case, the processing at step S12 may be omitted.

The configurations of the embroidery data generation device 1 and the sewing machine 3 may be changed as appropriate. The embroidery data generation device 1 may be a computer dedicated to the generation of embroidery data, or may be a mobile terminal device, such as a smart phone, a tablet, or the like. The embroidery data generation device 1 may be provided in the sewing machine 3. It is sufficient that the sewing machine 3 be capable of sewing the embroidery pattern, and the sewing machine 3 may be an industrial sewing machine, a multi-needle sewing machine, or the like. A micro-computer, an application specific integrated circuit (ASIC), a field programmable gate array (FPGA), or the like may be used as the processor in place of the CPU 11. The main processing may be performed by distributed processing by a plurality of processors.

What is claimed is:

1. A non-transitory computer-readable medium storing computer-readable instructions for sewing data generation that are executed by a processor provided in a sewing data generation device, the computer-readable instructions performing processes comprising:
    acquiring image data;
    determining, from a plurality of modes, a mode to determine a tendency of a plurality of thread colors to be used, the plurality of thread colors to be used being thread colors used in sewing of an embroidery pattern that represents an image represented by the acquired image data;
    selecting, on the basis of a target mode that is the determined mode, a plurality of thread colors among which at least one thread color is different for each of the modes, from a plurality of stored thread colors that are thread colors stored in a storage portion, as the plurality of thread colors to be used; and
    generating embroidery data to form, using a sewing machine, stitches of the selected plurality of thread colors to be used.

2. The non-transitory computer-readable medium according to claim 1, wherein
    the plurality of stored thread colors are associated with each of a plurality of thread color groups each including a plurality of thread colors,
    the instructions perform a process further comprising:
    determining one of the plurality of thread color groups, and
    the selecting of the plurality of thread colors to be used includes selecting the plurality of thread colors to be used from the plurality of stored thread colors associated with the determined thread color group.

3. The non-transitory computer-readable medium according to claim 1, wherein
    priority information for each of the plurality of stored thread colors is associated with each of the plurality of modes, the priority information indicating a priority of the selected plurality of thread colors to be used,
    the priority information associated with each of the plurality of modes indicates a ranking of the priority that is mutually different for at least one of the stored thread colors, and
    the selecting of the plurality of thread colors to be used includes selecting the plurality of thread colors to be used from the plurality of stored thread colors, in accordance with the priority indicated by the priority information associated with the target mode.

4. The non-transitory computer-readable medium according to claim 3, wherein
the priority information indicates the priority on the basis of at least one of a brightness, a saturation, and a hue of the thread color.

5. The non-transitory computer-readable medium according to claim 3, wherein
the plurality of modes include a mode that is associated with the priority information that indicates that the priority of a thread color having a low saturation is higher than the priority of a thread color having a high saturation, with respect to a plurality of thread colors that are chromatic colors having the same brightness as each other, among the plurality of stored thread colors.

6. The non-transitory computer-readable medium according to claim 3, wherein
the plurality of modes include a mode that is associated with the priority information that indicates that the priority of a thread color having a high saturation is higher than the priority of a thread color having a low saturation, with respect to a plurality of thread colors that are chromatic colors having the same brightness as each other, among the plurality of stored thread colors.

7. The non-transitory computer-readable medium according to claim 3, wherein
the plurality of modes includes one of
a mode associated with the priority information that excludes a thread color having a minimum brightness among the plurality of stored thread colors, from selection candidates in the selecting of the plurality of thread colors to be used, and
a mode associated with the priority information that indicates the thread color having the minimum brightness, among the plurality of stored thread colors, to be lowest ranking in the priority.

8. The non-transitory computer-readable medium according to claim 3, the instructions perform a process further comprising:
setting a use number that is a number of the selected plurality of thread colors to be used,
wherein
the selecting of the plurality of thread colors to be used includes selecting, in accordance with the priority, a number of the plurality of thread colors to be used corresponding to the set use number, from among the plurality of stored thread colors.

9. The non-transitory computer-readable medium according to claim 8, the instructions performing processes further comprising:
identifying, among the plurality of stored thread colors, a use frequency of the thread color corresponding to a color of each of pixels configuring the image represented by the acquired image data; and
determining, on the basis of the identified use frequency, whether the stored thread colors satisfy a predetermined condition,
wherein
the selecting of the plurality of thread colors to be used includes selecting, in accordance with the priority, the number of the plurality of thread colors to be used corresponding to the set use number, from among the thread colors determined to satisfy the predetermined condition, of the plurality of stored thread colors.

10. The non-transitory computer-readable medium according to claim 8, the instructions performing a process further comprising:
receiving a specific thread color that is a thread color input by a user, of the plurality of stored thread colors,
wherein
the selecting of the plurality of thread colors to be used includes
selecting the received specific thread color as the thread color to be used, irrespective of the priority, and
selecting, in accordance with the priority, from among the thread colors excluding the specific thread color, of the plurality of stored thread colors, a number of the thread colors to be used corresponding to a difference between the use number and a number of the received specific thread colors.

11. The non-transitory computer-readable medium according to claim 1, wherein
a type of a parameter relating to an image and a change amount of the parameter are associated with each the plurality of modes,
the instructions perform a process further comprising:
converting the acquired image data by changing the type of the parameter associated with the target mode in accordance with the change amount, and
when the image data is converted, the plurality of thread colors to be used are used to sew an embroidery pattern representing an image represented by the converted image data.

12. An embroidery data generation device comprising:
a processor; and
a memory storing computer-readable instructions that, when executed by the processor, perform processes comprising:
acquiring image data;
determining, from a plurality of modes, a mode to determine a tendency of a plurality of thread colors to be used, the plurality of thread colors to be used being thread colors used in sewing of an embroidery pattern that represents an image represented by the acquired image data;
selecting, on the basis of a target mode that is the determined mode, a plurality of thread colors among which at least one thread color is different for each of the modes, from a plurality of stored thread colors that are thread colors stored in a storage portion, as the plurality of thread colors to be used; and
generating embroidery data to form, using a sewing machine, stitches of the selected plurality of thread colors to be used.

* * * * *